United States Patent

Tammera et al.

[11] Patent Number: 5,190,650
[45] Date of Patent: Mar. 2, 1993

[54] TANGENTIAL SOLIDS SEPARATION TRANSFER TUNNEL

[75] Inventors: Robert F. Tammera, West Orange; Donald F. Shaw, Denville; Kenneth J. Reinman, Long Valley; George Melfi, Whippany, all of N.J.

[73] Assignee: Exxon Research and Engineering Company, Florham Park, N.J.

[21] Appl. No.: 720,056

[22] Filed: Jun. 24, 1991

[51] Int. Cl.⁵ .................. B01J 8/18; B01D 21/26
[52] U.S. Cl. ................................. 210/256; 55/318; 55/459.1; 208/161; 209/144; 209/211; 210/512.2; 210/787; 422/144; 422/147
[58] Field of Search .......... 210/256, 512.1, 512.2, 210/259, 787; 209/144, 211; 208/161; 422/144, 147; 55/315, 318, 459.1

[56] References Cited

U.S. PATENT DOCUMENTS

| | | | |
|---|---|---|---|
| 4,070,159 | 1/1978 | Myers et al. | 422/147 |
| 4,176,083 | 11/1979 | McGovern et al. | 422/144 |
| 4,572,780 | 2/1986 | Owen et al. | 422/144 |
| 4,606,814 | 8/1986 | Haddad et al. | 208/161 |
| 4,629,552 | 12/1986 | Haddad et al. | 422/144 |
| 4,778,660 | 10/1988 | Haddad et al. | 422/144 |
| 4,797,262 | 1/1989 | Dewitz | 422/144 |
| 4,869,880 | 9/1989 | Hettinger et al. | 422/144 |
| 4,909,993 | 3/1990 | Haddad et al. | 422/144 |

Primary Examiner—Robert A. Dawson
Assistant Examiner—David Reifsnyder
Attorney, Agent, or Firm—Joseph J. Dvorak

[57] ABSTRACT

Accordingly, the present invention, in one embodiment, encompasses an apparatus for the fluidized catalytic cracking of a hydrocarbon feed comprising: a riser which is generally vertically positioned within a catalyst disengaging zone and which has a plurality of openings around the circumference of the riser at its discharge end. The openings in the riser have a vertical stub portion that extends tangentially outwardly from the riser and communicates with a first end of an upwardly sloping curvilinear tunnel that terminates at a second end. The second end of the tunnel opens into a tangential opening in the primary cyclone. The area of the opening of the first end of the tunnel is larger than the area of the opening of the second end of the tunnel.

4 Claims, 3 Drawing Sheets

TANGENTIAL SOLIDS SEPARATION TRANSFER TUNNEL

FIELD OF THE INVENTION

The present invention is concerned with the separation of fluidized solids from a fluidizing gaseous phase. More particularly, the present invention is concerned with the separation of fluidized catalytic particles from the gas suspension phase in a fluidized catalytic cracking unit.

BACKGROUND OF THE INVENTION

There are wide varieties of chemical processes which are conducted using particles of fluidized particle size suspended in a gaseous phase. Of particular importance in the petroleum industry is the well known fluidized catalytic cracking process (FCC) in which the particles that are fluidized and suspended in a gaseous phase are catalyst particles. In this typical hydroconversion process, it ultimately becomes necessary to separate the particulate material from the fluidizing gas and this is generally achieved in a catalyst separation zone equipped with cyclones.

Recent trends of fluidized catalytic cracking have tended toward operation of the process at higher temperatures with extremely active catalysts. The concomitant result is that there has been an everincreasing necessity to be able to efficiently separate the catalyst from the fluidizing media in an extremely rapid and efficient manner in order to minimize undesirable side reactions. Consequently, there has been a plethora of methods and apparatuses developed to achieve the separation of fluidized catalyst particles from the fluidizing gas.

The following U.S. Patents illustrate the number of apparatuses and methods employed: U.S. Pat. Nos. 4,070,159; U.S. Pat. No. 4,176,083; U.S. Pat. No. 4,572,780; U.S. Pat. No. 4,606,814; U.S. Pat. No. 4,629,552; U.S. Pat. No. 4,778,660; U.S. Pat. No. 4,792,437; U.S. Pat. No. 4,869,880 and U.S. Pat. No. 4,909,993.

The foregoing patents show various riser termination devices with internal vanes and the like used in an attempt to bring about satisfactory separation of fluidized particles from the entraining gas.

It is an object of the present invention to provide an improved method and an apparatus for removing fluidizable particles from a fluidizing gaseous stream.

It is another object of the present invention to provide an apparatus which will permit the fluidized solid fluid gas mixture to travel directly from a riser into a primary cyclone.

It is another object of the present invention to provide an apparatus which will channel the natural movement of the fluidized solids into the cyclone in such a way as to avoid abrupt diversion of the gas stream and changing of its essential flow pattern as it exits the riser and enters a primary cyclone.

SUMMARY OF THE INVENTION

Accordingly, the present invention, in one embodiment, encompasses an apparatus for the fluidized catalytic cracking of a hydrocarbon feed comprising: a riser which is generally vertically positioned within a catalyst disengaging zone and which has a plurality of openings around the circumference of the riser at its discharge end. The openings in the riser have a vertical stub portion that extends tangentially outwardly from the riser and communicates with a first end of an upwardly sloping curvilinear tunnel that terminates at a second end. The second end of the tunnel opens into a tangential opening in the primary cyclone. The area of the opening of the first end of the tunnel is larger than the area of the opening of the second end of the tunnel.

In another embodiment of the invention, there is provided an improvement in the method of separating entrained solids from a gaseous phase wherein the mixture is guided from a vertically disposed riser to a cyclone, the improvement comprising increasing the acceleration of the mixture and providing a smooth transition as it is guided from the riser to the cyclone.

DETAILED DESCRIPTION OF THE PREFERRED EMBODIMENT

The present invention is particularly suitable for use in operation of a typical fluidized catalytic cracking unit and, consequently, the description of the invention will be made with particular reference to such a unit. Nonetheless, it should be readily appreciated that the device of the present invention will be equally suitable for separating fluidized solids from gases in other processes requiring such separation.

In fluid catalytic cracking processes, a catalyst of fluidized particle size that has been heated to an elevated temperature, for example, in the range of about 1150° F. to about 1350° F., is introduced with a petroleum feedstock into the bottom of a riser tube, with the result that there is a large volume of gaseous hydrocarbons generated therein, which are at temperatures of from about 950° F. to about 1000° F. This results in the concurrent flow of the catalyst part icles and the vapor hydrocarbons through the riser tube, where they are introduced into a disengaging zone for the purpose of separating the catalyst from the vapor phase.

The present invention is directed toward an improved apparatus for separating the catalyst particles from the vapor phase exiting from the riser. This is achieved by passing the gas outwardly from the discharge end of the riser in substantially a tangential direction and then arcuately into and through an upwardly curvilinear conduit or tunnel for tangential entry into the inlet of a primary cyclone.

The invention will be better appreciated by reference to the drawings.

Figure 1:
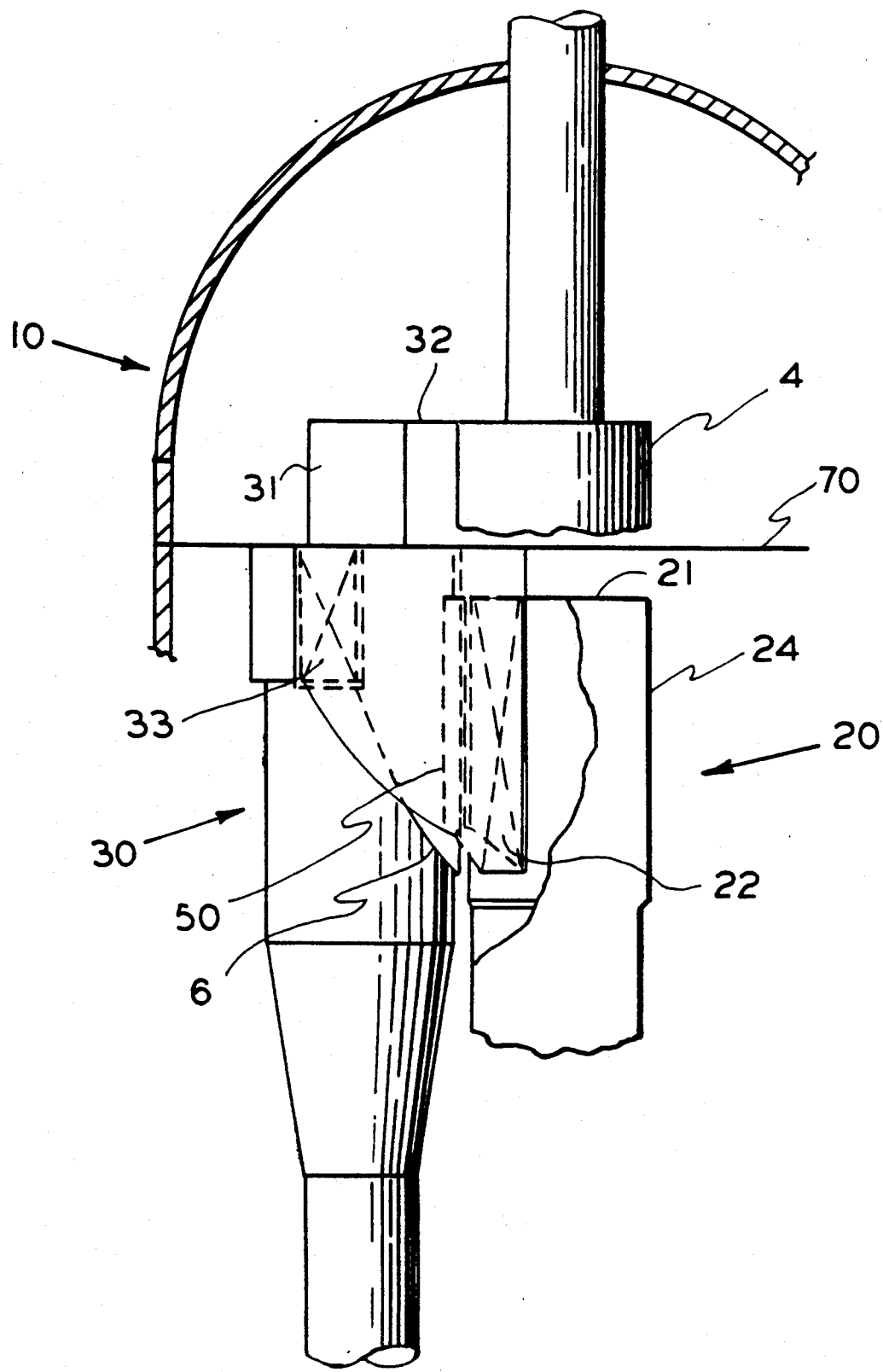
FIG. 1 is a fragmentary elevational view of an FCC unit showing, in part, a riser, one primary and one secondary cyclone and the unique tunnel structure in accordance with a preferred embodiment of the present invention.
Figure 2:
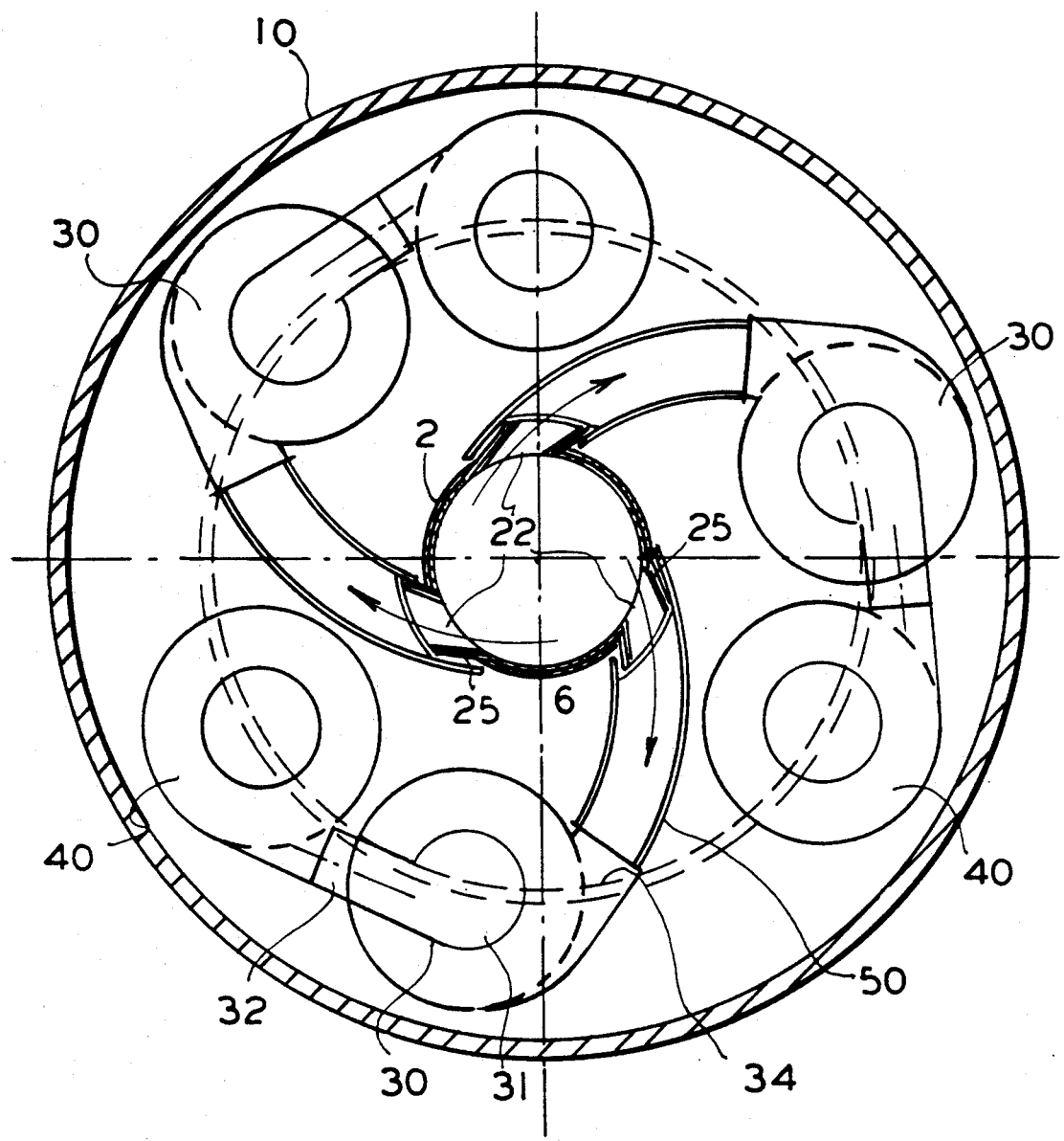
FIG. 2 is a simplified plan view showing the upper section of a typical fluidized cat cracking unit, incorporating the structure of the present invention.
Figure 3:
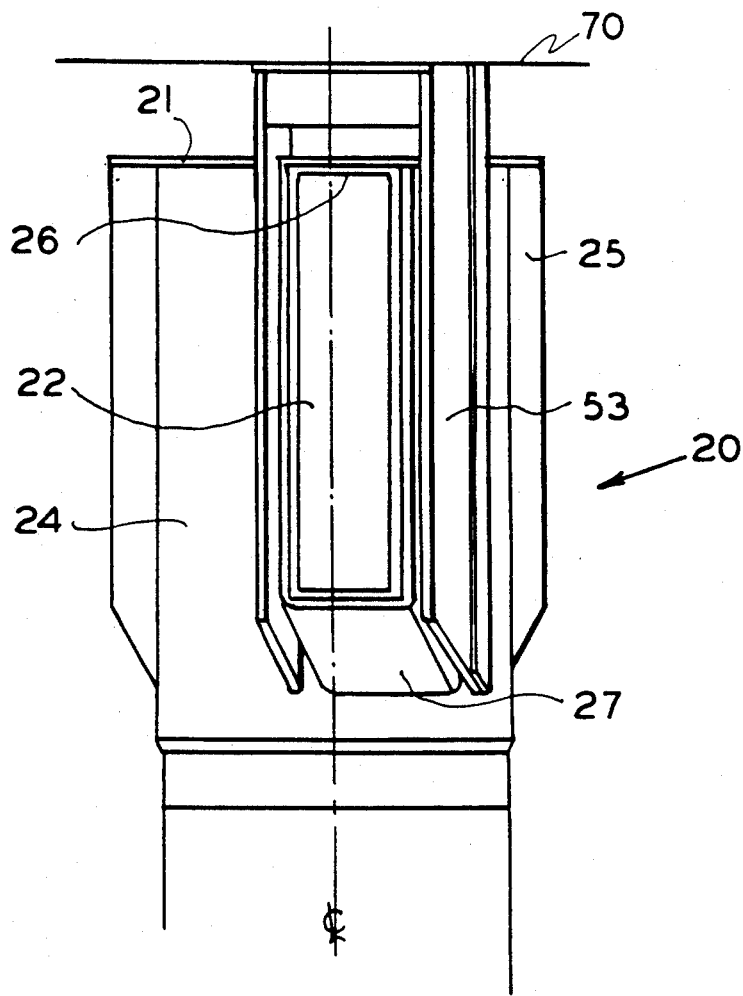
FIG. 3 is a side view of a riser terminating in a separation zone and equipped with arcuately shaped stubs in accordance with the invention.

Referring now to FIGS. 1 and 2, there is shown a solids gaseous separation system located within a vessel 10. The system includes a riser 20, which is generally vertically disposed within vessel 10. Riser 20 has an upstream end (not shown) in which fluidized solid particles, such as fluidized catalyst particles, enter and progress upwardly through to the downstream end 24 of the riser 20. The riser tube 20 at the downstream end 24 is closed at its top by plate 21. A plurality of ports 22 are spaced preferably uniformly around the periphery of the riser tube 20 at the downstream end 24. Each of the openings in ports 22 are further defined by a pair of vertical walls or projections 25 that are substantially tangential to the periphery of the riser 20. These stub-like projections 25 provide a primary means for guiding the flow of entrained solids from the downstream end of the riser outwardly in a substantially tangential direction. Optionally and preferably, each pair of stub-like projections 25 is provided with a top projection 26 and a bottom projection 27 connecting the side walls 25 and defining therebetween a substantially rectangular opening or short stub-like conduit. As can be seen in FIG. 3, in the preferred embodiment of the present invention, the bottom wall 27 is sloped in an upward direction.

In the vessel 10, as can be seen, particularly in FIG. 2, are provided a plurality of primary cyclones 30, which will correspond in number to the number of openings 22 in riser 20. Optionally and preferably, there will be provided a plurality of secondary cyclones 40 corresponding in number to the primary cyclones 30. The gas outlet 31 of a primary cyclone 30 will be connected through a conduit 32 to the respective inlet of the secondary cyclone 40.

It is an important feature of the present invention that the ports 22 in the downstream end 24 of riser 20 be substantially larger than the respective openings 33 into the primary cyclones 30. Indeed, it is particularly preferred, in the practice of the present invention, that the openings or ports 22 be from about 90% to about 100% greater than the openings 33 in the primary cyclones 30.

Figure 4:
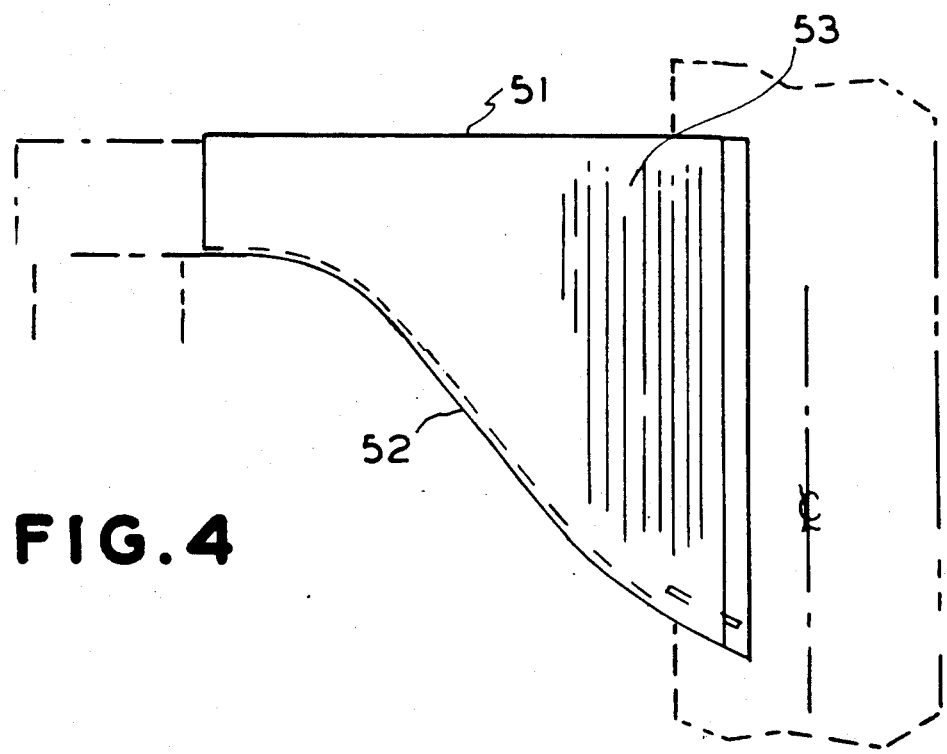
FIG. 4 is a diagrammatic side view of the tunnel communicating with the riser and a cyclone in accordance with the present invention.

As shown in FIGS. 1 and 2, a tunnel 50 is provided for each of the ports 22 to guide the flow of fluidized solids from the riser 20 into the inlet 33 of the primary cyclone 30. In plan view, such as shown in FIG. 2, the tunnels 50 have side walls 53 that are generally arcuately shaped, thereby providing for a substantially smooth transition of the flow of solids from the riser 20 into the primary cyclones 30. As indicated previously, however, the opening 22 of the riser is significantly larger than the opening 33 of the primary cyclone and, consequently, as can be seen in FIG. 4, the bottom wall 52 of the tunnel 50 has a generally upwardly sloping direction that is generally curvilinear in shape. The top wall 51 of the tunnel 50 is generally horizontally disposed. Indeed, in one embodiment of the invention, the tunnel 50 can be positioned with respect to an internal baffle 70, shown in FIG. 1, so that the baffle 70 can also serve as the top wall 51 for tunnel 50. As shown in FIG. 2, tunnel 50 may be connected directly to the solid gas inlet 34 of a primary cyclone 30; however, it is particularly preferred, in the practice of the present invention, that the tunnel 50 have an opening at its inlet end that is sufficiently large to fit around the stub projecting walls 25 of riser 20, so as to permit movement of the tunnel 50 with respect to the riser 20 during thermal cycling of the vessel without creating any mechanical strains. This arrangement will also permit the entry of gases into the tunnel 50 from the reactor plenum.

Because of the upward curvilinear design of the tunnel 50, tunnel 50 can be cleared of solids when conditions necessitate. Thus, it is particularly preferred that a space be provided between at least the bottom wall 52 of the tunnel and stub 27, so as to permit automatic draining of any particles that may possibly accumulate within the tunnel in the event of adverse operating conditions.

As should be readily appreciated, by providing an arcuately shaped tunnel that has an inlet opening substantially larger than its outlet opening into the cyclone, a centrifugal force is created that aids the transitional flow from the riser to the primary cyclone. Once the entrained solids have entered into the tunnel from the riser, they accelerate and travel into the primary cyclone at the proper cyclone inlet velocity, thereby enhancing the separation efficiency of the primary cyclones.

It should be readily appreciated that, although specific embodiments and aspects of the invention have been shown and described, many modifications can be made without departing from the spirit and scope of the invention. Accordingly, the invention is not limited to the foregoing description, but is only limited by the scope and claims which follow.

What is claimed is:

1. An apparatus for separation of fluidized solids suspended in a gaseous phase comprising:
   (a) a vessel having a disengaging zone;
   (b) a vertical tubular riser positioned in the vessel, the riser having a discharge end located in the disengaging zone, the riser having at its discharge end a plurality of openings in the periphery;
   (c) a pair of vertical projections for each peripheral opening in the riser, the projections extending outwardly and substantially tangential to the tubular riser, the vertical projections being connected by top and bottom projections which with the vertical projections define a conduit;
   (d) a cyclone for each opening in the riser, the cyclone having an inlet for receiving entrained solids discharged from an opening in the riser, the cyclone inlet having an area less than the area of the opening of the riser;
   (e) arcuately shaped tunnel means communicating with the riser opening and the cyclone inlet, the tunnel means having an inlet end which fits around, but is spaced apart from the conduit defining projections extending from the riser whereby entrained solids discharged from the riser are guided through an arcuate path for tangential introduction into the cyclone inlet.

2. The apparatus of claim 1 wherein the riser opening has an area which is 90 to 100% greater than the cyclone inlet area.

3. The apparatus of claim 2 wherein the tunnel includes an upwardly curvilinear bottom wall.

4. The apparatus of claim 3 wherein the bottom projection on the riser slopes upwardly.

* * * * *